United States Patent [19]

Rampel et al.

[11] Patent Number: 5,064,735
[45] Date of Patent: Nov. 12, 1991

[54] CADIUM ELECTRODE AND PROCESS FOR ITS PRODUCTION

[75] Inventors: Guy G. Rampel; Vincent J. Puglisi, both of Gainesville, Fla.

[73] Assignee: Gates Energy Products, Inc., Gainesville, Fla.

[21] Appl. No.: 382,816

[22] Filed: Jul. 19, 1989

Related U.S. Application Data

[63] Continuation-in-part of Ser. No. 274,262, Nov. 21, 1988, abandoned.

[51] Int. Cl.$^5$ .................. H01M 4/44; H01M 4/26
[52] U.S. Cl. ............................. 429/206; 429/222; 252/182.1; 24/623.5
[58] Field of Search ............... 429/217, 222; 29/623.5; 252/182.1

[56] References Cited

U.S. PATENT DOCUMENTS 2,870,234  1/1959  Moulton ........................ 429/222
3,751,300  8/1973  Yamamoto et al. .
4,765,799  8/1988  Waldrop .

FOREIGN PATENT DOCUMENTS 0862092  3/1961  United Kingdom .

OTHER PUBLICATIONS

Gross, Causes of Failure in Sealed Nickel-Cadmium Batteries, Energy Conversion, vol. 11, pp. 39–45, Pergamon Press, 1971, Great Britain.

Primary Examiner—Donald L. Walton
Attorney, Agent, or Firm—C. H. Castleman, Jr.; J. L. Isaac; H. W. Oberg

[57] ABSTRACT

A cadmium electrode for use in rechargeable alkaline cells is disclosed featuring use of dispersed polyamide having specific properties. The polyamide serves as a binder as well as an anti-agglomerant to retard cadmium agglomeration during use of the electrode. The use of elemental silver additive dispersed throughout the electrode is also disclosed, as is the use of zirconium material as an elecrolyte wicking and anti-compressive agent. A process for making any of the foregoing electrodes is disclosed featuring the step of forming a paste by mixing together the polymeric resin, active cadmium material and a non-aqueous solvent, applying the paste to a conductive substrate and removing the solvent. Alternatively, known prefabricated cadmium electrodes, such as Teflon-bonded or sintered types, are post-treated through dipping or the like in a solution of the aforementioned polyamide.

45 Claims, 5 Drawing Sheets

CADIUM ELECTRODE AND PROCESS FOR ITS PRODUCTION

CROSS REFERENCE TO RELATED APPLICATION

This application is a continuation-in-part of copending application S.N. 07/274,262, now abandoned filed Nov. 21, 1988, entitled "Cadmium Electrode and Process for its Production."

BACKGROUND OF THE INVENTION

This invention relates to improved cadmium negative electrodes for use in galvanic cells, and a process for producing the same. More particularly the invention pertains to flexible cadmium electrodes which are capable of being wound in a jelly-roll configuration for use in rechargeable nickel-cadmium alkaline cells.

The typical known cadmium electrode consists of a mixture of cadmium oxide, cadmium hydroxide, cadmium metal, a minor amount of nickel hydroxide to retard cadmium agglomeration (and capacity fade), and a binder to provide integrity to the mixture and secure attachment to an electrically conductive substrate. In preparing pasted cadmium electrode plates, it has been common practice to use a water soluble or water dispersible resin as the binder for the electrochemically active material. The use of water to blend the electrochemically active ingredients with the binder has several drawbacks however. The water reacts with cadmium oxide to form the corresponding hydroxide which is of lower density. The result is a reduction in capacity of the electrode as well as pollution of process water. The hydroxide form presents the further drawback that it reacts with air on stand to form the undesirable carbonate species. Water in the presence of air also promotes conversion of the cadmium metal to cadmium hydroxide.

Perhaps the best prior art non-sintered cadmium electrodes have been made using polytetrafluoroethylene (PTFE) dispersible resin in water. The PTFE binder holds the electrode mass together by a series of fibrillate fibers throughout the active mass and serves to enhance recombination of oxygen at the negative cadmium electrode on charge and overcharge. It is also known to catalyze this oxygen recombination reaction by impregnating the active mass of the cadmium electrode with sub-microscopic silver particles, as taught in U.S. Pat. No. 3,877,985 (Rampel). Typically this type of Teflon bonded electrode has been prepared according to the teachings of U.S. Pat. No. 3,954,501 (Rampel), the disclosure of which is herein incorporated by reference. In this process cadmium oxide is hydrated to typically about 70 percent. Nickel hydroxide up to about 2.0 weight percent is also added to retard cadmium agglomeration (densification) as taught in U.S. Pat. No. 3,870,562 (Catherino). Nevertheless, cycle life of sealed nickel-cadmium cells incorporating these cadmium electrodes is limited primarily by the agglomeration phenomenon to about 250 cycles in certain applications. The agglomeration causes a gradual reduction of the active electrode surface area due to densification of the cadmium metal (charge state). Thus, the effective current density gradually increases and the capacity of the cell measured in ampere hours deliverable to a fixed cut-off voltage decreases. For applications requiring long cycle life the usefulness of this known cell is accordingly limited.

Japanese patent publication no. 57-174864 assigned to Matsushita recognizes the disadvantages of transformation of cadmium oxide to cadmium hydroxide when employing water soluble pastes. This patent publication discloses the use of poly (vinyl) alcohol as a binder dispersed in ethylene glycol or propylene glycol non-aqueous solvents. The strength and conductivity of this electrode are improved by adding resin or metal fibers to the paste, however these fibers are acknowledged to increase the difficulty of extruding or slurry coating the electrode substrate as it is pulled through a slit. The fibers used include acrylonitrile-vinyl chloride copolymer, polyamide and polyvinylchloride as resin fibers, and steel, nickel, and nickel plated resin fiber as metal fibers. The capacity of the resultant electrode is disclosed as 75 mAh/cm$^2$.

Japanese patent publication no. 52-31348 assigned to Furukawa discloses a method for preparing a cadmium electrode including the steps of filling and then drying a paste formed by mixing a powdered cadmium active material, a binder solution and a lower melting point nylon powder composed of a copolymer of nylon 6, nylon 66 and nylon 12, in a substrate, and heating the paste at a temperature exceeding the melting point of the lower melting point nylon whereupon the nylon powder is melted to bind the active material powders. It is believed this method will fail to produce an electrode with satisfactory dispersion of the nylon, and that the in situ melted nylon will mask the activity of the cadmium. Most importantly this reference does not disclose use of a material which will retard cadmium agglomeration during electrode cycling.

The state of the prior art of cadmium electrodes is also represented by the teaching of Japanese patent publication no. 54-106830 (assigned to Furukawa and reported in CA 92:8884m). According to that reference a paste consisting of cadmium oxide or cadmium hydroxide and a binder is applied on to a porous sheet coated with thermally fusible nylon grains, and the pasted sheet dried and conversion treated to prepare cadmium anodes. Nylon grains of 0.2–0.4 mm are disclosed as being blown on a nickel-plated iron sheet and a paste consisting of cadmium hydroxide, nickel powder, short fibers, poly (vinyl) alcohol, carboxymethyl cellulose, and water is applied to the nylon-coated sheet with a reported reduction in the percentage of defective electrodes produced. It is believed the nylon serves as a binder to promote cohesion between the active material and substrate.

It is a primary object of the present invention to provide a cadmium electrode whose life is extended by retarding cadmium agglomeration.

It is another object of this invention to provide a means for imparting anti-agglomerating characteristics to known cadmium electrodes to extend their life, and a simple process to achieve the same including post treatment of prefabricated, known electrodes.

It is another object of this invention to prevent or severely retard hydration of the active material of a cadmium electrode during manufacture and storage.

A further object of the invention is to provide a cadmium electrode employing a novel anti-agglomerating material also serving as a binder characterized by the following properties: imparts improved adhesion and cohesion of the active cadmium material to itself as well as to the electrode substrate; remains stable in the cell environment; the binder does not significantly mask the active material which would otherwise limit high rate performance and gas recombination efficiency; provides flexibility so that the resultant electrode can be wound if desired; and produces an electrode paste which can be readily applied to a substrate by extrusion, slurry coating or other methods adapted to continuous manufacture with a high degree of uniformity of application.

It is still a further object to provide a cadmium electrode for use in a rechargeable cell employing an alkaline electrolyte in which the binder/anti-agglomerant is preferably in the form of a microporous interconnecting polymeric network, and in which an additive is intimately mixed with the active material which functions as an electrolyte wick to maintain electrolyte at the active porous surfaces of the electrode retained in the polymeric network, during charge and discharge of the electrode and which also functions as an anti-compressive agent to maintain the proper porosity and physical dimensions of the electrode during such charging and discharging.

It is still a further object to provide the foregoing electrodes, a simple and effective process for producing such electrodes, and improved rechargeable alkaline cells, namely nickel-cadmium and the like, employing such electrodes.

These and other objects of the invention are met and disadvantages of the prior art solved by employing the electrode plate and its method of preparation according to the present invention as described herein.

SUMMARY OF THE INVENTION

Briefly described, in one aspect the invention is drawn to a cadmium electrode for use in a rechargeable cell employing an alkaline electrolyte, including an electrically conductive substrate supporting an electrochemically active cadmium material; polyamide dispersed within the electrochemically active material which serves as an anti-agglomerant retarding cadmium agglomeration during use of the electrode; and a mixture of particulate electrochemically active cadmium material co-dispersed with said polyamide and in electrical contact with the substrate during charge and discharge of the electrode.

In another aspect the invention is directed to a cadmium electrode for use in a rechargeable cell employing an alkaline electrolyte, including an electrically conductive substrate supporting an electrochemically active material; an interconnecting network preferably microporous of polyamide linked to the substrate and serving the dual function of a binder and an anti-agglomerant retarding cadmium agglomeration during use of the electrode; and a mixture of particulate electrochemically active cadmium material retained in and dispersed through the binder network and in electrical contact with the substrate during charge and discharge of the electrode.

In another aspect of the invention, a cadmium electrode for use in a rechargeable cell employing an alkaline electrolyte is provided including an electrically conductive substrate supporting an electrochemically active material; an interconnecting polymeric network preferably microporous linked to the substrate and serving as a binder; and a mixture of particulate electrochemically active cadmium material and zirconium material retained in and dispersed through said network.

In another aspect of the invention, a cadmium electrode for use in a rechargeable cell employing an alkaline electrolyte is provided including an electrically conductive substrate supporting an electrochemically active material; an interconnecting polymeric network preferably microporous linked to the substrate and serving as a binder; and a mixture of particulate electrochemically active cadmium material and finely divided metallic silver coated on a non-electrochemically active carrier, retained in and dispersed through said network.

In a further aspect the invention is directed to a process for producing a cadmium negative electrode including the steps of forming a mixture by blending together a polyamide resin, an electrochemically active cadmium material and a substantially non-aqueous solvent; applying such mixture to an electrically conductive substrate to form a coated substrate; and removing solvent from the coated substrate.

In a further aspect, the invention is directed to a process for producing a cadmium electrode including the steps of forming a mixture by blending together a polymeric resin, an electrochemically active cadmium material, finely divided metallic silver (elemental form) and a substantially non-aqueous solvent; applying the mixture to an electrically conductive substrate to form a coated substrate; and removing solvent from the coated substrate.

In still a further aspect, the invention is directed to a process for producing a cadmium electrode for a rechargeable cell including the steps of applying a mixture including an electrochemically active cadmium material to a conductive substrate to form a prefabricated electrode having a porous structure; forming a solution of polyamide in a solvent, the polyamide being of a type such that during cycling of the rechargeable cell agglomeration of the cadmium material is retarded; applying such polyamide solution to the prefabricated electrode so that the polyamide solution penetrates into and wets at least a portion of such porous structure; and removing solvent.

BRIEF DESCRIPTION OF THE DRAWINGS

Preferred embodiments of the invention will be illustrated in conjunction with the accompanied drawings, in which like numerals designate like parts, and in which.

PREFERRED EMBODIMENTS OF THE INVENTION

The cadmium electrode of the invention will be described primarily in association with the nickel electrode as the counter positive electrode, and principally in respect to the sealed nickel-cadmium alkaline cell of the well-known spiral wound configuration. It will be understood that the cadmium electrode of the invention has utility in various alkaline galvanic cells with any suitable positive electrode such as mercury or silver, for instance, in addition to nickel. The cells may be of the sealed variety in which oxygen generated on charge and overcharge at the positive electrode is recombined by reduction at the negative electrode, or at an auxiliary electrode, or the cadmium electrode may be used in flooded (vented) cells as well. The configuration of the cell may be cylindrical, of the button type, bobbin construction, prismatic parallelepiped, as illustrative examples. In the most preferred embodiment of the invention the cadmium electrode plate of the invention is spirally wound on a suitable mandrel with a counter positive electrode, insulated from one another with an interposed separator material, into the so-called jelly-roll plate and separator configuration.

Figure 1:
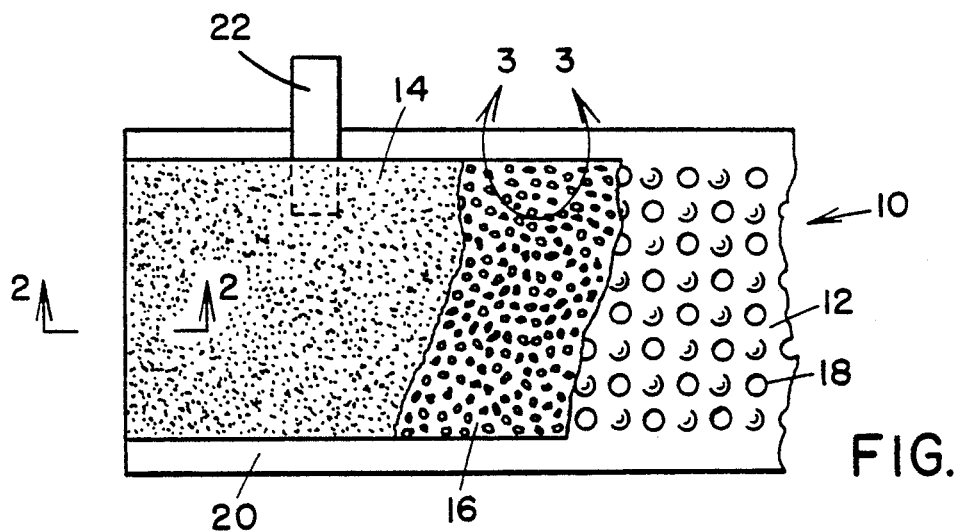
FIG. 1 is a side elevational, partially broken away view of an electrode constructed in accordance with the invention.
Figure 2:
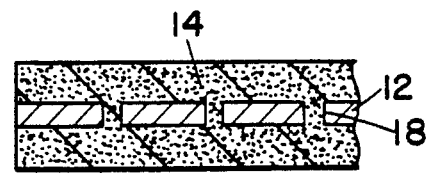
FIG. 2 is a partial sectional view of the electrode taken along 2—2 of FIG. 1.
Figure 3:
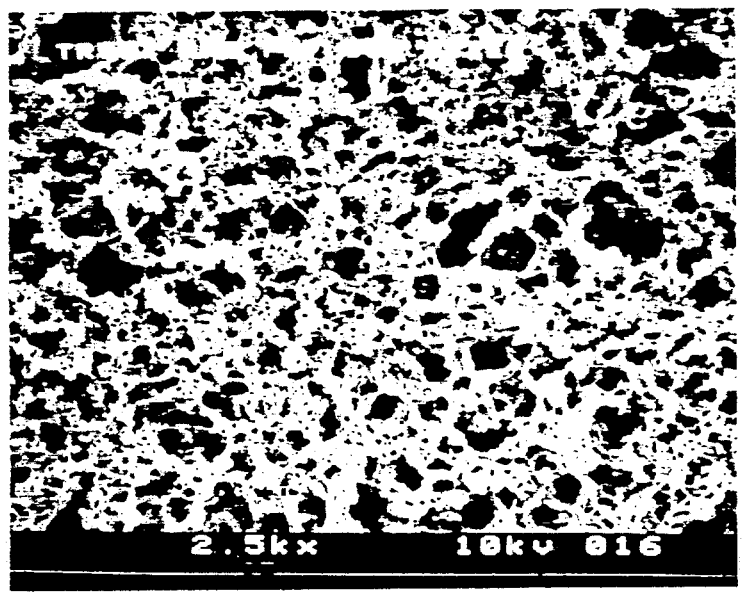
FIG. 3 is a scanning electron photomicrograph at 2500X of the binder structure of the electrode of the invention following extraction of active mass (taken along 3—3 of FIG. 1)

Referring to FIGS. 1–3 the cadmium electrode of the invention shown generally at 10 includes an electrically conductive substrate 12 on which is supported an electrochemically active material 14. The electrochemically active material includes particulate electrochemically active cadmium material which, in the preferred embodiment, is retained in and dispersed through microporous interconnecting polymeric binder network 16, shown in FIG. 1 and in FIG. 3 with the active cadmium mass extracted for purposes of illustration. The electrochemically active cadmium material makes electrical contact with the substrate either directly or with the aid of alkaline electrolyte present in the electrode during charge and discharge of the electrode in a cell.

Electrically conductive substrate 12 may be formed of any suitable electrically conductive material compatible with the components of the cell and may be configured as desired. Preferably, the substrate is foraminous, in such forms as perforated nickel-plated steel sheet having a plurality of perforations 18, as shown, or in such alternative forms as woven wire screen, expanded mesh, foam metal, non-woven metal fibers, sintered metal plaque or the like, or combinations of the foregoing. The surface may be stippled or embossed, as shown, to enhance bonding. If a foam metal or sintered structure is employed, with or without an associated sheet substrate 12, the pore structure of the foam or plaque preferably should be such as to readily accommodate impregnation, pasting or the like of the active material in its interstices.

The substrate 12 not only supports the active mass within its perforations 18 or other interstices, but also preferably supports a layer of the active mass 14 on either or both major faces of the substrate 12. The substrate also may be provided with a solid margin or border 20 on one or more of its edges which is free of active material to accommodate electrical connections to one of the terminals of the cell in which the electrode is utilized. For this purpose, an optional current collector tab 22 may also be used (or in lieu of border 20) as is well known in the art.

The active electrode material 14 supported on the substrate 12 includes a mixture of particulate "electrochemically active cadmium material" by which is meant to include cadmium metal particles and cadmium oxide particles in a predetermined proportion of about 0–15 percent by weight metallic cadmium and about 85–100 percent by weight cadmium oxide.

In accordance with one aspect of the invention the electrochemically active cadmium material mixture is retained in and dispersed preferably throughout a binder/anti-agglomerant matrix formed of an interconnecting network preferably microporous of polyamide 16. This binder/anti-agglomerant is chosen from a class of preferably alcohol soluble polyamide resins with melting points generally above about 25° C., preferably above about 50° C., but less than about 300° C., consistent with desired solubility and such mechanical properties as elongation. The binders/anti-agglomerants preferably exhibit sufficient elongation to be windable without substantial shedding.

The binder/anti-agglomerant materials which have to date exhibited the best performance in cells incorporating the electrodes of the invention are polyamides formed from a fatty acid dimer-based thermoplastic polyamide resin. The most preferred polyamide materials useful for this invention are high molecular weight products having a number average molecular weight from about 5,000 to 50,000 and, more preferably from about 10,000 to 35,000, obtained by the reaction of essentially stoichiometric amounts of a long-chain high molecular weight aliphatic or cycloaliphatic dibasic acid containing from about 18 to 52 carbon atoms, and optionally up to about 30 weight percent of a short-chain saturated dibasic acid containing from 2 to 13 carbon atoms. The polymeric materials typically have softening points in the range 80° to 240° C. with amine values less than 3. Especially useful materials are those polyamides derived from polymeric fatty acids obtained by the dimerization of predominantly $C_{18}$ acids, particularly polymeric fatty acid products containing 75 percent by weight or more $C_{36}$ dimer acids, and mixed diamines differing in chain length by at least 3 carbon atoms and wherein the longer chain diamine constitutes from 5 to 35 equivalents percent of the total diamine. Even more preferable are those polymeric materials where azelaic acid, sebacic acid, dodecanedioic acid or brassylic acid are employed as part of the dibasic acid charge.

Materials which have been found especially suitable are manufactured by the Henkel Corporation of Chicago, Ill. USA as hot melt adhesives under the registered trademark Macromelt, the Macromelt 6200 series being most preferred at present. Another dimer acid based polyamide resin which has favorable properties is manufactured by Union Camp Corporation of Jacksonville, Fla. USA under the registered trademark UNI-REZ 1554, which is normally used as a hot melt for bonding of leather and other porous substrates.

The most preferred polyamide binders/anti-agglomerants are chosen to provide a desirable balance between hydrophobic and hydrophilic properties. For instance, with the preferred fatty acid dimer-based polyamides, the amide groupings (hydrophilic) are believed to enhance ion permeability i.e. hydroxyl ion transport, and the fatty acid portion (hydrophobic) assisting oxygen gas recombination. The particular combination of and hydrophilic groupings and overall structure are believed to impart anti-agglomerant activity.

Compared to standard nylon 6 and 66 which typically have ratios of oxygen to carbon (by elemental analysis) of about 0.22 and nitrogen to carbon of about 0.19, the preferred polyamides of the invention typically have a ratio of oxygen to carbon of about 0.07 (generally about 0.05 to about 0.09) and a ratio of nitrogen to carbon of 0.06 (generally about 0.04 to about 0.08). Standard nylon 12 has an oxygen to carbon ratio of 0.111 and nitrogen to carbon ratio of 0.097, also in contrast to the preferred ratios of the invention.

It has been found unexpectedly that the aforementioned class of polyamide materials provide not only conventional binder properties of adhesion and cohesion but also have been found to impart effective anti-agglomerant properties to the electrode. As an anti-agglomerant the polyamide material is believed to greatly retard if not eliminate entirely the normal tendency of cadmium to agglomerate (densify) during cycling of the electrode. The cycle life of the electrode is greatly improved with virtually no degradation in capacity (measured in ampere-hours) throughout the extended life of the electrode. Although not completely understood, it is believed that the amide functionality in conjunction with the hydrophobic portions of the polyamide binder/anti-agglomerant chemically interferes with the normal tendency of adjoining cadmium particles under compaction to consolidate and thereby lose effective surface area. Standard nylon 6, 66 and 12, in contrast, are chemical inert and largely lack ion permeability and, hence, are capable of providing binding but not anti-agglomerant properties. The binder/anti-agglomerant is preferably present in an amount from about 0.05 to about 3 percent, more preferably from about 0.1 to about 2.5 percent by weight of the solids content of the electrode mass (excluding the substrate).

Typically the polyamide resin of the invention is dispersed or dissolved in a substantially nonaqueous solvent of hydrocarbon base and then subsequently mixed intimately with the electrochemically active cadmium material along with other additives, as discussed hereafter. However, it is also suitable to mix all of the dry ingredients and solvent together, forming a suitable generally homogeneous paste mixture for application to the electrically conductive substrate to which the paste mixture will become securely bonded. It has also been found unexpectedly that a prefabricated cadmium electrode of various types, such as the aforementioned known PTFE-bonded cadmium electrode, or sintered cadmium electrode, may be post-treated by dipping the electrode into or otherwise applying (e.g. by brushing or spraying) a suitable solution of the polyamide binder/anti-agglomerant directly to the exterior of such prefabricated electrode. In the latter case, the polyamide solution readily wets and penetrates into at least a substantial portion of the porous structure of the electrode. Preferably the polyamide solution achieves total wetting and penetration into such electrodes, and produces the aforedescribed interconnecting network. Solvent is subsequently removed, preferably in toto, by drying, etc.

Three classes of solvents, in ascending order of effectiveness, are useful for the preferred resins, namely (i) non-hydrogen bonding solvents such as hydrocarbons and chlorinated hydrocarbons, (ii) moderate hydrogen bonding solvents such as esters and ethers; and (iii) strong hydrogen-bonding solvents such as alcohols. Preferred solvents which may be utilized include aliphatic alcohols including straight chain low molecular weight alcohol solvents with preferably at least two carbon atoms, such as n-propanol and n-butanol, although isopropanol has also been found suitable. Chlorinated solvents are also effective as well as mixtures of solvents such as n-propanol/1,1,2-trichloroethane. Aromatic solvents and mixtures are also effective such as n-propanol/toluene. Aqueous based solvents or co-solvents should be avoided because of hydration of cadmium oxide to the less preferred cadmium hydroxide specie, and for the other reasons previously mentioned. However, minor proportions of water e.g. less than about 25 percent, more preferably less than about 5 percent may be added to the solvent mixture without significant hydration or other deleterious effect.

The cadmium metal powder used in the electrode mass preferably has an average particle size of from about 3 to about 12 microns, and more preferably from about 5 to about 10 microns. If cadmium metal is present, the cadmium metal is preferably stabilized with at least 1 percent cadmium oxide to prevent premature oxidation of the cadmium metal particles prior to mixing with the cadmium oxide particles. In a preferred embodiment the cadmium metal particles will be more or less spherically shaped. As is known, such cadmium metal powder may be produced by condensing vaporized cadmium metal in the presence of a controlled amount of oxygen. The cadmium metal provides a precharge in the unformed electrode as fabricated, primarily to enhance oxygen recombination on overcharge but also to increase conductivity during the early cycles of a cell incorporating the electrode of the invention.

It is also desirable to incorporate nickel hydroxide powder in the electrode mass, to improve anti-fading properties of rechargeable cells incorporating the cadmium electrodes of the invention. The amount of nickel hydroxide present in the finished electrode (excluding the substrate) is preferably less than about 2.0 percent by weight, more preferably less than about 1.5 percent by weight. The anti-fading properties imparted by the nickel hydroxide are a result of retardation of cadmium agglomeration on cycling, however this effect appears to diminish after approximately 200-250 cycles unless the present in the electrode. As will be seen hereafter, the polyamide binder/anti-agglomerant has extended the anti-fading properties of such electrodes from about 250 cycles to greater than about 400 cycles in the charge/discharge regime employed.

In another embodiment of the invention, zirconium material, in the form of zirconium oxide or the like, is in admixture with the particulate electrochemically active cadmium material, and retained in and dispersed throughout the (preferably) microporous interconnecting polymeric binder network (preferably formed of polyamide material as previously discussed). The zirconium material functions as an electrolyte wick, retaining alkaline electrolyte along its surface and thereby serving as a capillary bridge promoting wetting of the particles of cadmium and cadmium oxide. This facilitates the electrochemical charge and discharge reactions. Quite importantly, this zirconium material serves the additional function of imparting anticompressive characteristics to the electrode. In this manner, with cycling of the electrode the required morphology and porous structure of the electrode is more or less preserved.

The zirconium is present in the range from preferably about 0.1 percent to about 5.0 percent, more preferably from 0.75 to about 3.0 percent, based on the total dry paste weight.

In addition to zirconium oxide, fibrous materials of microdenier, such as Dynel (acrylamide copolymer) or nylon fibers having a denier from about 1.0 to about 2.0 and which wet alkaline electrolyte may be used advantageously in the electrode. Such fibers in use in the electrode wick alkaline electrolyte along their fibrous surfaces thereby helping to distribute electrolyte to the active surfaces in the electrode.

In a related aspect of the invention, preferably the zirconium material or less preferably other non-electrochemically active carrier material bears a layer of finely divided metallic silver coated thereon, the silver coated carrier being retained in and dispersed through the (preferably) interconnecting polymeric binder network. The presence of microscopic silver particles catalyzes the oxygen recombination reaction as taught in U.S. Pat. No. 3,877,985 (Rampel). However, in that patent the silver was applied to the electrode by immersing the electrode in a solution containing silver ions. The silver ions upon contacting the reduced active metal (cadmium) of the electrode entered into a redox reaction wherein the active cadmium was oxidized and the silver was reduced to metallic silver as a selective coating on the cadmium. However, this process limited the amount of silver which could be deposited to the amount of precharged cadmium which was available, normally less than about 30 percent of the total cadmium material in the electrode. Moreover, the silver which was coated on the cadmium particles was not distributed uniformly throughout the electrode. In the subject invention the silver is introduced as a coating on the non-electrochemically active material as elemental silver, preferably in sub-microscopic particulate form, whereby an even distribution throughout the electrode is obtained. In effect, the carrier material such as zirconium oxide acts as a catalyst carrier for the silver coating.

It has been found unexpectedly that the silver present in the electrode of the invention not only serves to enhance oxygen recombination by catalysis, but also retards or eliminates the growth of cadmium metal deposits (dendritic) in the separator during cycling, by promoting rapid oxidation of the cadmium deposits.

The silver metal is present in the range from preferably about 0.05 percent to about 0.5 percent, more preferably 0.075 percent to about 0.5 percent, based on the total dry paste weight.

Figure 6:
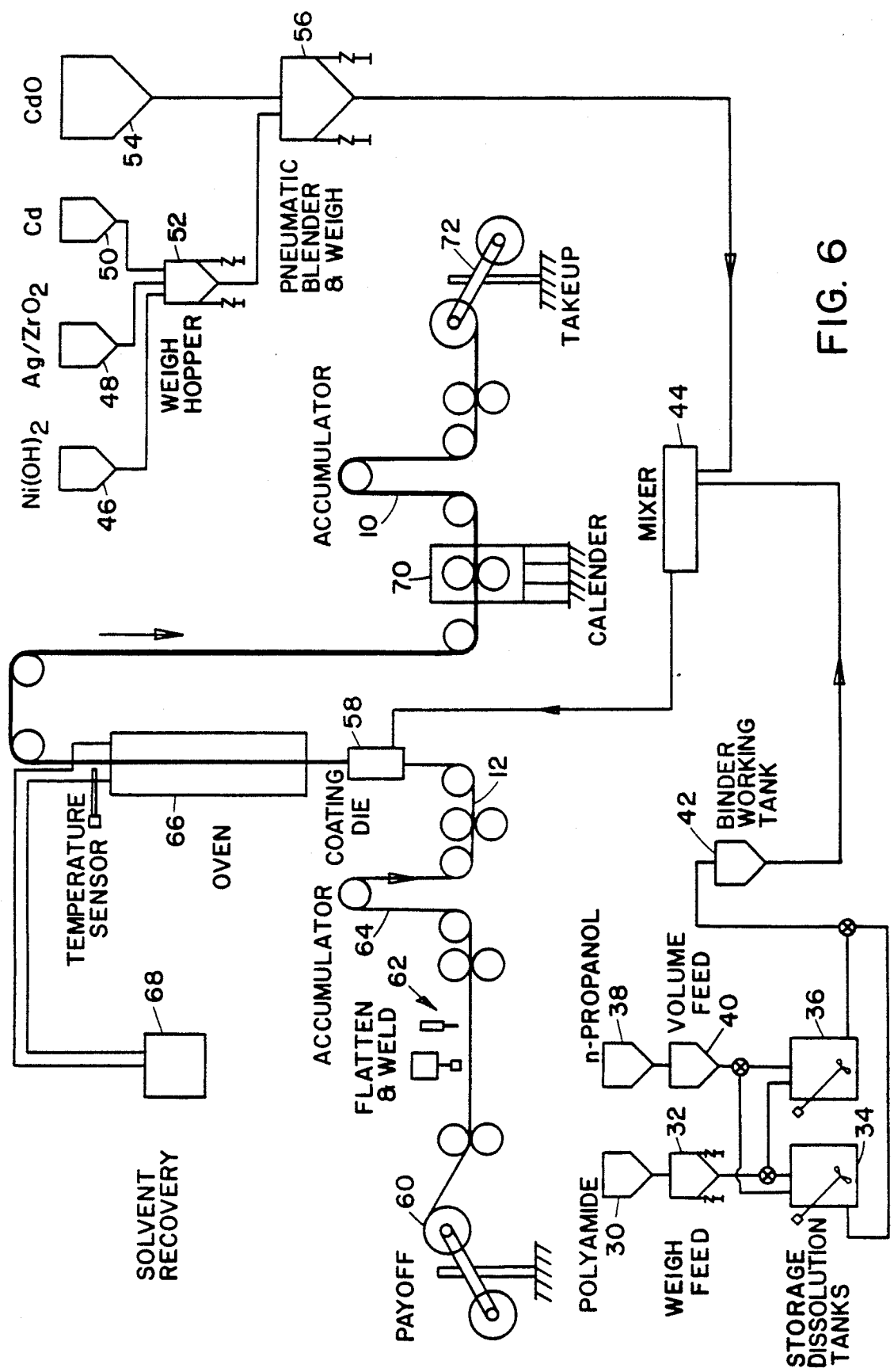
FIG. 6 is a process flow diagram illustrating means for carrying out the process of the invention.

A preferred process for producing a cadmium electrode in accordance with the invention is schematically illustrated in FIG. 6. In one stage polyamide resin of the aforementioned type is dispersed or dissolved separately in n-propanol by supplying polyamide 30 to weight feeding apparatus 32 and then through appropriate valving to storage dissolution tanks 34, 36 while also supplying n-propanol 38 on a volumetric basis through feeder 40 into the same dissolution tanks 34, 36. The output from these tanks is metered to binder working tank 42 which in turn supplies the dissolved or dispersed resin to mixer 44 to be joined with the electrochemically active components.

To this end nickel hydroxide 46, zirconium oxide carrier coated with silver 48 and metallic cadmium precharge 50 are fed to weigh hopper 52 in correct proportion and then delivered along with cadmium oxide 54 to pneumatic blender 56 where they are thoroughly mixed, weighed and then delivered to mixer 44 in correct proportion to be intimately mixed with the dissolved binder/anti-agglomerant from tank 42. The silver is coated on the zirconium by adding zirconium oxide and silver nitrate together and then reducing the same in a hydrogen atmosphere as more fully discussed in Example II below.

After thorough mixing of the binder/anti-agglomerant solution and active components at stage 44, the resultant paste or slurry mixture is applied to electrically conductive substrate 12 by delivering the mixture preferably at a constant volumetric flow rate to a coating or extrusion device such as coating die 58. The grid substrate is passed through coating die 58 from a payoff roll 60, the substrate optionally having been flattened through suitable rollers and fitted with current collector tabs 22 welded at station 62. For continuous extrusion a standard accumulator 64 may be provided in advance of the coating die. As substrate 12 passes through coating die 58, the paste mixture 14 is applied preferably to both sides of the substrate to form outer layers, as well as filling the interstices 18 in the substrate (see FIGS. 1 and 2).

The thus paste coated substrate (shown thickened) is then passed preferably vertically through oven 66 along a sufficient path length and with adequate residence time for the temperature employed to remove the solvent (which is recovered separately in tank 68). Oven residence times in the range from about 0.3 to about 2.0 minutes have been found suitable for electrodes 0.025 inches thick.

By controlling the speed of the substrate through the coating die and the delivery rate of the paste to the die, the paste weight and distribution can be maintained within suitable tolerances. After withdrawal from oven 66, the continuously pasted plate 10 may be subject to further operations such as sizing in calender 70, take up on apparatus 72, and subsequent cutting, trimming or post-application of tabs (none of which are shown).

Figure 4:
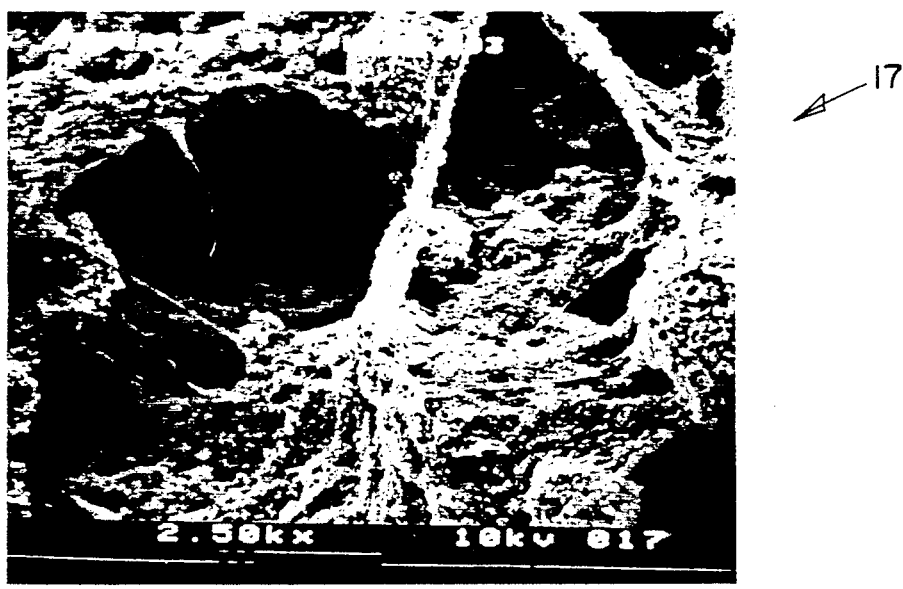
FIG. 4 is a scanning electron photomicrograph at 2500X of a prior art PTFE binder structure following extraction of the active mass.

Turning now to FIG. 3, the binder/anti-agglomerant structure of the electrode of the invention prepared according the foregoing process is shown in the photomicrograph at 2500X. The preferred binder/anti-agglomerant structure 16, shown after extraction of the active mass and other ingredients with 10 percent acetic acid preferably has the characteristics of microporosity, uniformity of the microporous structure, and essentially no tendency to mask the active material which will be retained in its pores. The structure could be characterized as sponge-like, resembling the structure of coral. The pore size distribution and degree of uniformity will vary depending on the dispersing vehicle and other factors. The distribution and pore structure is a function of the active ingredient(s), particle size and distribution which varies with source of materials and process parameters. Typically the average pore size will be about the same as the size of the cadmium oxide particles contained in the network, and for the example shown in FIG. 3 is preferably from about 0.2 to about 20, more preferably from about 5 to about 15 microns. The microporous structure depicted in FIG. 3 is contrasted with the prior art PTFE binder structure of U.S. Pat. No. 3,954,501 shown in the 2500X scanning electron micrograph of FIG. 4 at 17. As seen in FIG. 4, the polymeric binder structure is less microporous, and is less uniform with large cavities and a string-like structure. In effect, the structure of FIG. 3 results in an essentially complete porous coating of the active material with the completely dispersed polyamide present in the microporous network. The nature of that polyamide network results in a mechanical capturing of the active material while also imparting anti-agglomerant properties because of the hydrophobic and hydrophilic components of the binder structure. In contrast, the structure of FIG. 4 is hydrophobic in nature, and relies on a series of fibrillate fibers to hold the active mass together. The result is a relatively poor binding capability which depends on the presence of through-holes in the substrate for adequate adhesion.

As an alternative process for applying and dispersing the binder/anti-agglomerant material through the porous electrode structure, prefabricated cadmium electrodes may be post-treated in appropriate solutions of the polyamide, as previously discussed. Such prefabricated electrodes may contain their own binder systems which, after treatment with the polyamide solution, have enhanced binding structures, together with enhanced anti-agglomerant properties. The resultant electrodes, upon leaching of active species, resemble the structure of FIG. 3 except that both binding systems coexist.

Figure 5:
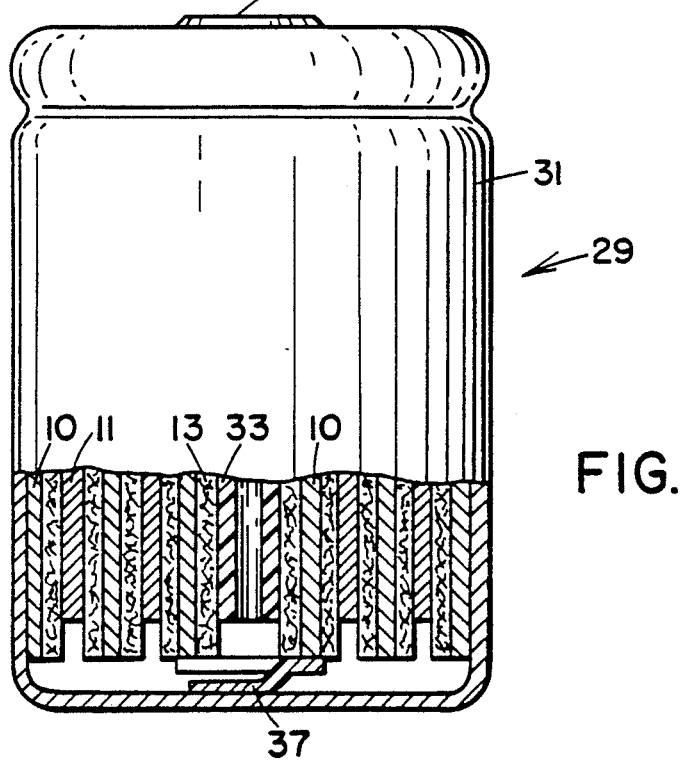
FIG. 5 is a schematic representation of a cylindrical sealed electrochemical cell employing the negative electrode of the invention.

An example of the type of secondary cell, preferably a Ni-Cd alkaline cell, in which the anode plate 10 of FIG. 1 may be incorporated, is illustrated in FIG. 5 generally at 29. The cell includes an outer conductive casing 31 forming the negative terminal of the cell. Within the cylindrical cell is mounted an optional winding spindle 33 formed of suitable insulating material and having spirally wound thereon in the familiar jelly-roll form an assembly consisting of cadmium negative plate 10 of the invention, positive plate or cathode 11, and a porous insulating separator 13 sandwiched between the positive and negative plates. The positive plate 11 which is insulated from casing 31, is electrically connected to positive output terminal 35, through a tab connection (not shown). To prevent short-circuiting between the edges of the positive plate and the cell casing, an annular insulating disk (not shown) may be provided above the top of the roll at the upper portion thereof, and in the bottom portion of the cell preferably cadmium plate 10 and separators 13 extend beyond the edges of the positive plate for insulation thereof. The negative plate is connected to the cell casing through lead 37, suitably attached by welding or the like to marginal edges 20 of the negative plate.

A suitable safety release valve (not shown) may be provided in the cap of the cell adjacent terminal 35. This permits release of pressure during abnormal operation, such as excessive overcharging.

An alkaline electrolyte, preferably potassium hydroxide at a suitable concentration such as 31 percent by volume, is impregnated in the pores of the plates and separator, being fully absorbed therein. The full pore volume of the plates and separators is not filled with electrolyte to thereby establish the well-known starved electrolyte condition satisfactory for ionic conduction as well as ready oxygen transport from the positive plate to the cadmium negative plate, where the oxygen is reduced. Because of this internal recombination of oxygen gas during the charging and overcharging operations, the cell is normally sealed and may be charged and discharged in any indiscriminate attitude without loss of electrolyte.

Aspects of the invention will be further described in the following working examples.

EXAMPLE I

A series of open flooded cells were built having an excess of positive electrode capacity and electrolyte. These cells were therefore constructed to be negative limited so that the electrical data reflected negative electrode performance. The cells were of prismatic design with a central flat negative plate and two outer flat positive plates with a layer of conventional battery separator of nonwoven nylon fibers sandwiched between and pressed against the opposite polarity plates. The dimension of the electrodes was 2.0×1.3 inches by 0.028 inches thick. The positive electrodes were of the sintered design and the total capacity of the positives at the 5C discharge rate was by design approximately 25 percent in excess of the negatives to be evaluated.

Negative electrodes of the invention with new binders and additives were tested for performance and cycle life against state-of-the-art negative PTFE based-electrodes ("controls") without nickel hydroxide additive. Numerous cells were built and extensively cycled to evaluate performance compared to the control negatives. The negative electrodes of the invention were prepared by mixing the following typical ingredients in the quantities listed in the table below:

| | Flooded Test Cells | | | |
|---|---|---|---|---|
| No. | Poly-amide (gms) | CdO (gms) | $ZrO_2$ (gms) | n-Propanol (Solvent) (gms) | Test Electrode Paste Dry Weight (gms) |
| 1 | 0.22 | 10.00 | 0.0 | 3–4 | 3.62 |
| 2 | 0.22 | 10.00 | 0.0 | 3–4 | 3.27 |
| 3 | 0.20 | 10.00 | 0.125 | 3–4 | 3.25 |
| 4 | 0.20 | 10.00 | 0.0 | 3–4 | 2.78 |

A convenient batch size of about 10 gms. was prepared and mixed at room temperature with 3–4 grams of n-propanol solvent. The amount of solvent depends on the paste characteristics required to apply the mix to the substrate used. In this case nickel-plated steel was used. The negative electrodes prepared were typically loaded to contain about 1300 milliamp hours of theoretical capacity (1.3 AH). The electrodes were then placed into the cell configuration as described and filled with 31 percent potassium hydroxide electrolyte to excess (flooded).

The following mix of ingredients define the formulation of the prior art control electrodes:

| | Prior Art (Control Test Cells) | | | |
|---|---|---|---|---|
| No. | Dupont TFE (T-30) (cc) | CdO (gms) | $ZrO_2$ (gms) | $H_2O$ (gms) | Test Electrode Paste Dry Weight (gms) |
| 5 | 0.20 | 10.00 | 0.0 | 5–6 | 3.95 |

The above was mixed with water and heated to coagulate the PTFE binder as taught in U.S. Pat. No. 3,954,501. In the process the cadmium oxide was converted to approximately 70 percent cadmium hydroxide. Nevertheless the test negative plates were loaded to about 1.4 AH of capacity, theoretical. It is to be noted that all these negatives were prepared without the use of nickel-hydroxide to influence the results.

Figure 8:
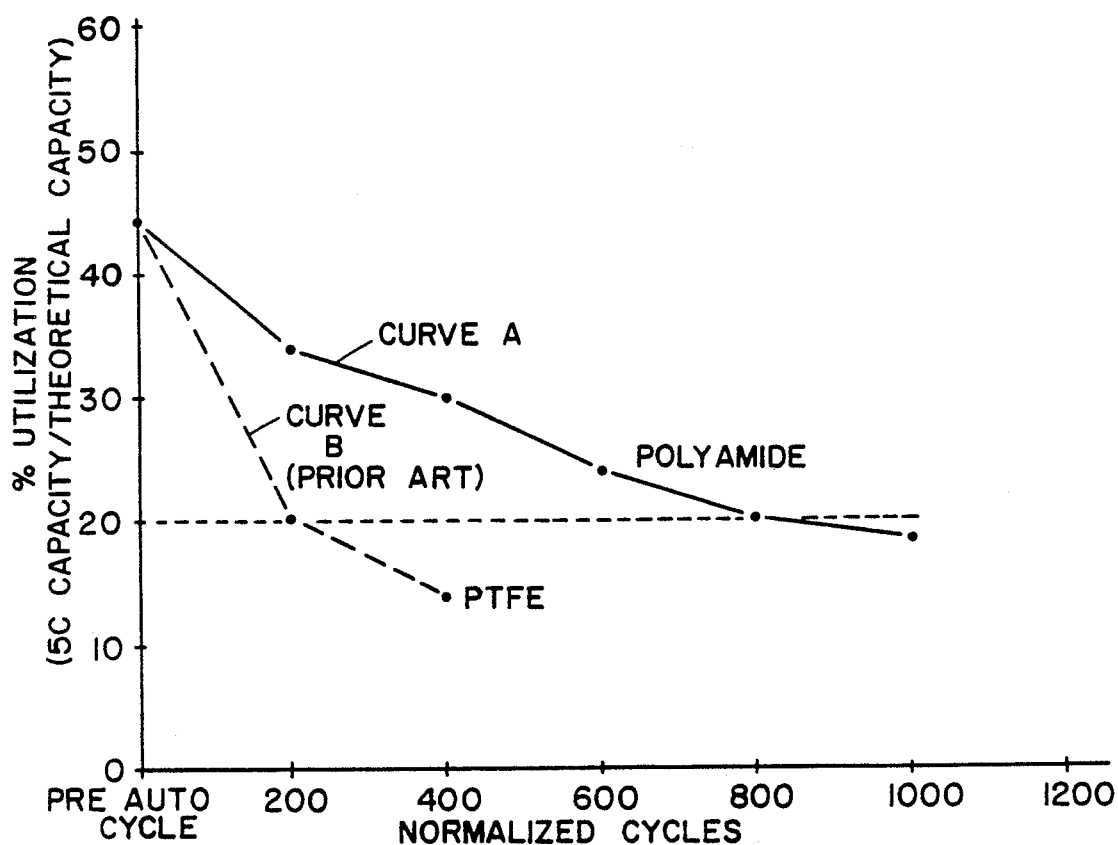
FIG. 8 is a graph of percent utilization of the electrode vs. cycle life for the electrodes of the invention compared to prior art electrodes in flooded test cells.

The above test cells of the invention and control cells were all cycled in series electrical connection as follows: The cells were charged at 0.5 amperes to replace the capacity discharged in the prior cycle together with an excess charge in each cycle of 2 percent or a C/D ratio of 1.02. The discharge for each cycle was carried out at 1.0 ampere. The cycles were controlled by solid-state coulometers to insure proper cycling modes. The depth-of-discharge (DOD) was programmed to prevent cell reversal. The number of cycles was normalized to adjust cycle count based on a DOD per cycle of 0.5 AH. At the completion of every 200 cycles (normalized) a complete discharge was conducted at the 5C rate (1.75 amperes) to a voltage of 0.6V/cell. The average capacity of cell nos. 1–4 obtained as a percent of the theoretical capacity is depicted by Curve A in FIG. 8 for the new improved test cells of the invention and by Curve B for the control cells of the prior art. FIG. 8 shows a substantial improvement in utilization of the new electrode and much longer life. At 200 cycles the control electrodes had dropped to 20 percent of theoretical. The electrodes of this invention at the same point had a utilization of 34 percent and only reach 20 percent at 850 cycles. Thus 650 more cycles were obtained with the test cells of the invention in the same test regime or a life improvement of 325 percent.

EXAMPLE II a) Electrode/Cell Preparation

Sealed wound nickel cadmium cells having a positive capacity of typically 1.2–1.4 ampere-hours were prepared. All cells had a common lot of positive electrodes and separator. The only differences between cells of the invention and control cells were the negative electrodes. The positive electrodes were standard nickel hydroxide/nickel hydrate impregnated in sintered nickel substrate of about 80 percent porosity. Two types of negatives were tested—negatives of this invention and commercially distributed control negatives representing the current state of the art. Both types of negative paste were applied to identical 2 mm perforated 0.002 inch thick nickel plated steel substrate.

Control electrodes and those of this invention were prepared using the following paste formulations:

| Ingredient | Electrode Type | |
|---|---|---|
| | Control | Invention |
| Binder | Dupont, TFE-30 0.20 cc | Polyamide, Henkel 6200 0.221 grams |
| CdO (grams) | 10.0 | 10.0 |
| Cd (grams) | 0.54 | 0.552 |
| Ni(OH)$_2$ (grams) | 0.12 | 0.124 |
| Ag/ZrO$_2$ (grams) | — | 0.152 (Note 3) |
| Solvent (grams) | H$_2$O, 6.0 | n-propanol, 2.76 |
| Weight (grams) | 12.6–13.0 (Note 1) | 11.2–11.7 (Note 2) |

Note 1 - approximately 70 percent hydration (conversion of CdO to Cd(OH)$_2$) weight included
Note 2 - assumes zero hydration
Note 3 - see b) below for description of preparation The controls were prepared by mixing the ingredients listed above and then heating to coagulate the PTFE binder as taught in U.S. Pat. No. 3,954,501. In the process the cadmium oxide was converted to approximately 70 percent cadmium hydroxide. (The balance of the cadmium oxide was converted to hydroxide in the cell upon activation with electrolyte, 31 percent KOH).

The paste was then applied to the substrate, dried, and the electrode cut to length. Finished cells were made by winding a negative and positive electrode and suitable separator into a coil, inserting the coil into a cylindrical can, making appropriate terminal connections, and adding the KOH electrolyte. The cell was then sealed to prevent loss of gases or electrolyte.

The electrodes of this invention were prepared by first dissolving the polyamide resin in the n-propanol "solvent." The other ingredients were then added and blended to obtain a homogeneous mixture with the paste characteristics required. The paste was applied to the substrate, dried and cut. Sealed wound cells were fabricated as with the controls.

Figure 7:
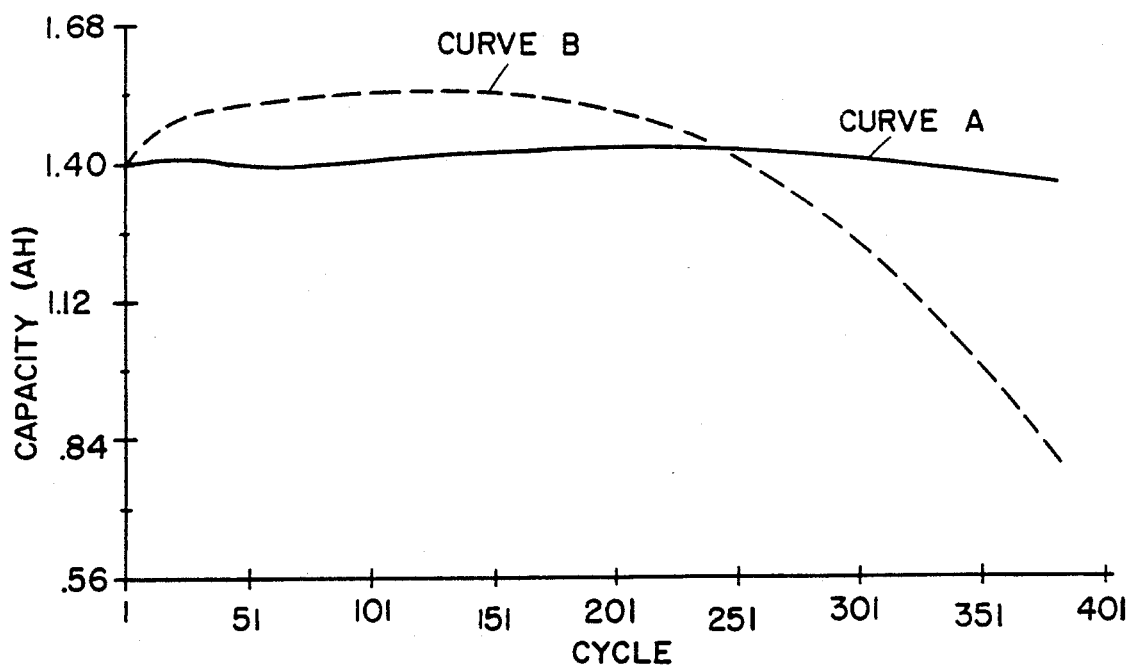
FIG. 7 is a graph plotting capacity of sealed nickel-cadmium cells vs. charge/discharge cycles, comparing prior art cells with cells employing the electrode of the invention.

Both groups of cells were then life tested in an accelerated regime and the results shown in FIG. 7. The cells with the improved negatives of the invention (Curve A) continued to function effectively for up to 400 cycles as shown in FIG. 7, or about 150 cycles longer than the cells with the control negative electrodes (Curve B) which faded rapidly in available capacity beyond the 250 cycle point due to loss of negative capacity. Both electrode types tested used Ni(OH)$_2$ as an additive to retard agglomeration as taught in Catherino U.S. Pat. No. 3,870,562. Both groups of electrodes were examined when testing was completed confirming that the control electrodes had agglomerated thus reducing active area and resulting in loss of capacity as seen in FIG. 7. The test electrodes were essentially free of agglomeration. Failure was attributable to accumulated cadmium in the separator used. The capacity of the electrodes of the invention was more consistent than the controls and at cycle no. 380 was about 97 percent of the start capacity (cycle no. 30).

b) Preparation of Silver Coated Zirconium Oxide 20.50 grams of AgNO$_3$ was dissolved in 20 mls deionized H$_2$O. The AgNO$_3$/H$_2$O solution was added to 125.0 grams ZrO$_2$ in a porcelain dish and mixed with a glass rod to achieve uniform mixture. The mixture was then dried under full vacuum at 100° to remove H$_2$O. The dispersed AgNO$_3$ was then reduced to silver metal under the following schedule and atmosphere.

| OPERATION | N$_2$ | H$_2$ | RESIDENCE |
|---|---|---|---|
| Sample dish in oven pot | 12 PSI | — | 10 Min |
| Oven pot placed in 870° C. furnace | 12 PSI | — | 5 Min |
| Start H$_2$ flow | 8 PSI | 10 PSI | 5 Min |
| Increase H$_2$; cut off N$_2$ | 0 | 22 PSI | 35 Min |
| Decrease H$_2$; start N$_2$ flow | 8 PSI | 10 PSI | 5 Min |
| Decrease H$_2$; increase N$_2$; remove from furnace | 11 PSI | 6 PSI | 10 Min |
| Cut off H$_2$ | 25 PSI | 0 | 20 Min |

The final product resulted in a high surface catalytic coating of silver metal on the zirconium oxide powder. In this example the final product weight was 138 grams of which 13 grams was silver metal.

EXAMPLE III

Cells prepared similar to those in Example II above without the use of zirconium oxide or silver also displayed significant life improvement over controls similar to the comparative relationship shown in FIG. 7. However, it is desirable to include these ingredients to further extend the functionality of these electrodes with wicking, and enhanced recombination properties as well.

While certain representative embodiments and details have been shown for the purpose of illustrating the invention, it will be apparent to those skilled in this art that various changes and modifications may be made therein without departing from the spirit or scope of the invention.

EXAMPLE IV

Sealed wound nickel cadmium cells having a positive capacity of typically 1.2-1.4 ampere-hours were prepared. All cells had a common lot of positive, negative electrodes (prior to treatment) and separator. The only differences between cells of the invention and control cells were whether or not the prefabricated negative electrodes were treated. The positive electrodes were standard nickel hydroxide/nickel hydrate impregnated in sintered nickel substrate of about 80 percent porosity. The negatives were commercially distributed PTFE-bonded control negatives representing the current state of the art. Negative paste was applied to 2 mm perforated 0.002 inch thick nickel plated steel substrate.

The electrodes were prepared using the paste formulations and process of the controls listed in Example II.

To form the negative electrode treatment solution, 12.0 grams of Henkel 6200 polyamide was dissolved in 588 grams of n-propanol (2 weight percent solution). The prefabricated PTFE electrodes prepared as controls per Example II were then dipped in the above solution of polyamide for a residence time of about one minute, removed, the excess solution allowed to drip off, and then dried at ambient temperature. Based on the available pore volume filled with the 2 weight percent solution by take up, the amount of solid polyamide absorbed and deposited was calculated to be 0.35 weight percent of the total dry paste weight.

Finished cells of nominal 1.40 Ah capacity were made by winding a negative and positive electrode and suitable separator into a coil, inserting the coil into a cylindrical can, making appropriate terminal connections, and adding the KOH electrolyte. The cell was then sealed to prevent loss of gases or electrolyte. This was done for control cells as well as cells of the invention employing the post-dipped cadmium electrodes.

Figure 9:
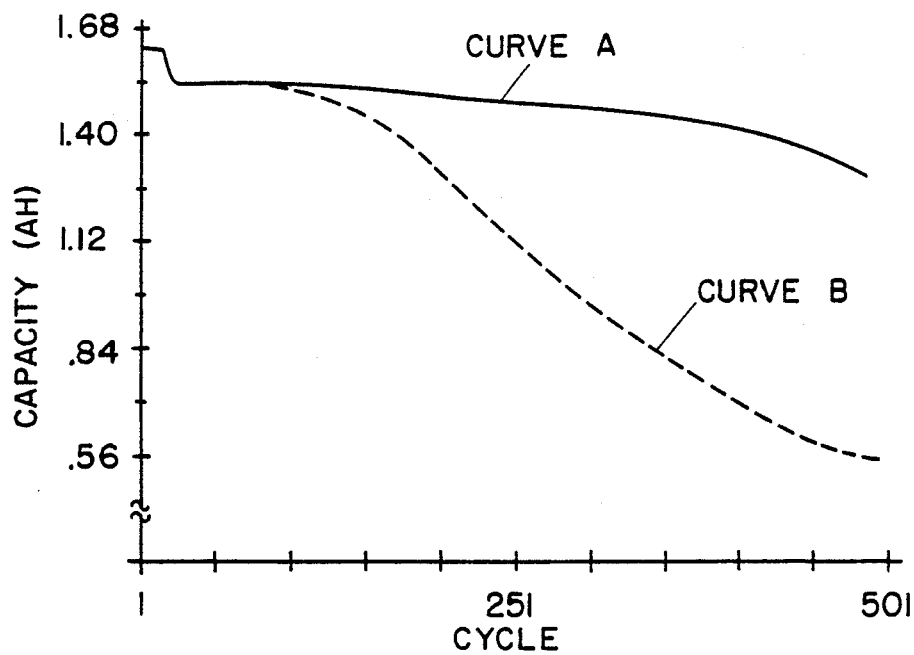
FIG. 9 is a graph plotting capacity of sealed nickel-cadmium cells vs. charge/discharge cycles, comparing prior art cells with cells using known electrodes treated in accordance with the invention.

Both groups of cells were then life tested in an accelerated regime and the results shown in FIG. 9. The cells with the improved post-treated (dipped) negatives of the invention (Curve A) continued to function effectively for up to 500 cycles as shown in FIG. 9, or about 250 cycles longer than the cells with the untreated control negative electrodes (Curve B) which faded rapidly in available capacity beyond the 200-250 cycle point due to loss of negative capacity. Both groups of electrodes were examined when testing was completed confirming that the control electrodes had agglomerated thus reducing active area and resulting in loss of capacity as seen in FIG. 9. The test electrodes (dipped) were essentially free of agglomeration. Failure was attributable to accumulated cadmium in the separator used. Other negative electrodes were treated in dip concentrations from 0.5-4.0 weight percent equivalent to deposits of polyamide from 0.09-0.73 weight percent with equivalent results.

Figure 10:
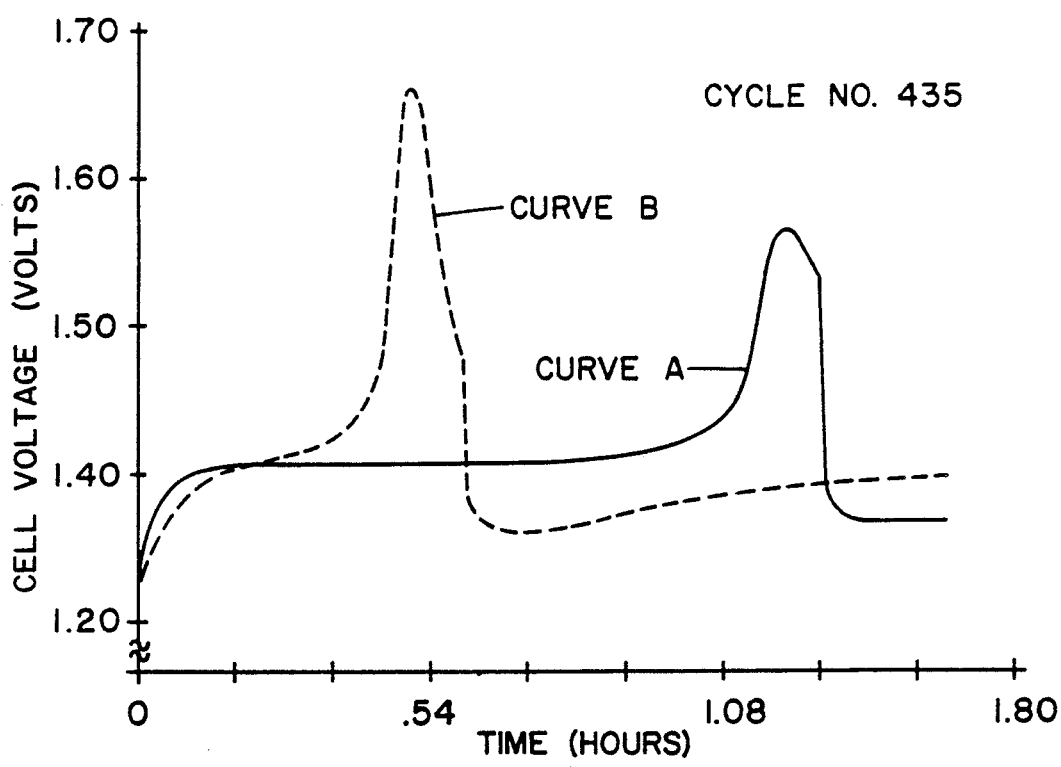
FIG. 10 is a graph plotting voltage vs. time of charge input for prior art sealed nickel-cadmium cells compared with cells employing electrodes treated in accordance with the invention, exhibited in FIG. 9.

The anti-agglomerant properties of the electrodes of the invention are further demonstrated in the comparative charge curves of FIG. 10. There it is seen that after cycle no. 435 (of FIG. 9) the charge voltage of cells of the invention (Curve A) goes through a maximum after one hour of about 1.55 volts, whereas the controls (Curve B) have poorer charge acceptance since their voltage rises to over 1.65 volts after only about 20 minutes of charging. The charging regime for all cells was 1.680 Amps for 1.50 hours, followed by a 2.00 minute rest, then discharge at 10.00 amps to a cutoff of 0.60 volts, and finally followed by a rest of 1.30 hours (the cycle was then repeated, etc.).

EXAMPLE V

The procedure of Example IV is repeated, replacing the standard PTFE bonded electrodes with standard sintered cadmium electrodes employing a sintered plaque network of about 80 percent porosity. The electrodes of the invention are formed by dipping such known sintered cadmium electrodes in the 2 weight percent solution of Henkel 6200 polyamide in n-propanol. Comparative results similar to Example IV are obtained, again attesting to the cadmium agglomeration retarding properties imparted by the polyamide dip solution.

While certain representative embodiments and details have been shown for the purpose of illustrating the invention, it will be apparent to those skilled in this art that various changes and modifications may be made therein without departing from the spirit or scope of the invention.

What is claimed is:

1. A cadmium electrode for use in a rechargeable cell employing an alkaline electrolyte, comprising:
   an electrically conductive substrate supporting an electrochemically active material;
   an interconnecting network of aliphatic alcohol soluble polyamide, the solubility limit of the polyamide in n-propanol being at least about 7.4 percent by weight, linked to the substrate and serving as i) a binder and ii) an anti-agglomerant retarding cadmium agglomeration during use of the electrode; and
   a mixture of particulate electrochemically active cadmium material retained in and dispersed through said network and in electrical contact with the substrate during charge and discharge of the electrode.

2. The cadmium electrode of claim 1 wherein the electrochemically active cadmium material comprises cadmium oxide, and in admixture therewith nickel hydroxide in an amount to further retard cadmium agglomeration (and capacity).

3. The cadmium electrode of claim 1 wherein the polyamide binder and anti-agglomerant is present as a microporous network in an amount from about 0.1 to about 3 percent by weight of the electrode (excluding the substrate).

4. A cadmium electrode for use in a rechargeable cell employing an alkaline electrolyte, comprising:
   an electrically conductive substrate supporting an electrochemically active material;
   an interconnecting network of aliphatic alcohol soluble polyamide linking to the substrate and serving as i) a binder and ii) an anti-agglomerant retarding cadmium agglomeration during use of the electrode, wherein the polyamide is formed from a fatty acid dimer-based polyamide resin in which the fatty acid dimer includes an aliphatic or cycloaliphatic dibasic acid containing from about 18 to 52 carbon atoms; and a mixture of particulate electrochemically active cadmium material retained in and dispersed through said network and in electrical contact with the substrate during charge and discharge of the electrode.

5. A cadmium electrode for use in a rechargeable cell employing an alkaline electrolyte, comprising:

an electrically conductive substrate supporting an electrochemically active material;

an interconnecting network of polyamide linked to the substrate and serving as i) a binder and ii) and anti-agglomerant retarding cadmium agglomeration during use of the electrode; and a mixture of particulate electrochemically active cadmium material retained in and dispersed through said network and in electrical contact with the substrate during charge and discharge of the electrode, wherein there is present in admixture with the electrochemically active cadmium material a zirconium material which is retained in and dispersed through said network.

6. The cadmium electrode of claim 5 wherein the zirconium material is in the form of zirconium oxide bearing a coating of elemental silver.

7. The cadmium electrode of claim 1 wherein said electrochemically active cadmium material comprises cadmium oxide in admixture with metallic cadmium in an amount sufficient to serve as a precharge and to enhance oxygen recombination during charging of the electrode.

8. The cadmium electrode of claim 1 wherein there is present in admixture with the electrochemically active cadmium material a fibrous material of microdenier having wetting properties allowing it in use to wick alkaline electrolyte along its fibrous surface.

9. A cadmium electrode for use in a rechargeable cell employing an alkaline electrolyte, comprising:

an electrically conductive substrate supporting an electrochemically active material;

an interconnecting polymeric network linked to the substrate and serving as a binder; and a mixture of particulate electrochemically active cadmium material and zirconium material retained in and dispersed through said network, the cadmium material making electrical contact with the substrate during charge and discharge of the electrode.

10. The cadmium electrode of claim 9 wherein said zirconium material during use of the electrode functions as an electrolyte wick.

11. The cadmium electrode of claim 10 wherein said zirconium material during use of the electrode also functions as an anti-compressive agent.

12. The cadmium electrode of claim 9 wherein the electrochemically active cadmium material comprises cadmium oxide, and in admixture therewith nickel hydroxide in an amount to further retard cadmium agglomeration (and capacity fade).

13. The cadmium electrode of claim 9 wherein the polymeric binder is formed of a polyamide resin, in the form of a microporous interconnecting network serving the additional function of an anti-agglomerant, and which is present in an amount from about 0.1 to about 3 percent by weight of the electrode excluding the substrate.

14. The cadmium electrode of claim 13 wherein the polyamide is formed from a fatty acid dimer-based polyamide resin.

15. The cadmium electrode of claim 9 wherein the material is in the form of zirconium oxide bearing a coating of elemental silver.

16. The cadmium electrode of claim 9 wherein said electrochemically active cadmium material comprises cadmium oxide in admixture with metallic cadmium in an amount sufficient to serve as a precharge and to enhance oxygen recombination during charging of the electrode.

17. The cadmium electrode of claim 9 wherein there is present in admixture with the electrochemically active cadmium material a fibrous material of microdenier having wetting properties allowing it in use to wick alkaline electrolyte along it fibrous surface.

18. A process for producing a cadmium electrode for a rechargeable cell comprising the steps of:

a) forming a paste mixture by blending together an aliphatic alcohol soluble polyamide resin, the solubility limit of the polyamide in n-propanol being at least about 7.4 percent by weight, an electrochemically active cadmium material and a substantially non-aqueous solvent to dissolve a substantial portion of the polyamide resin;

b) applying said mixture to an electrically conductive substrate to form a coated substrate; and c) removing solvent from said coated substrate.

19. A process for producing a cadmium negative electrode for a rechargeable cell comprising the steps of:

a) forming a paste mixture by blending together an aliphatic alcohol soluble polyamide resin, wherein said polyamide resin is a fatty acid dimer-based polyamide resin formed from a dibasic acid containing from 18 to 52 carbon atoms, an electrochemically active cadmium material and a substantially non-aqueous solvent to dissolve a substantial portion of the polyamide resin;

b) applying said mixture to an electrically conductive substrate to form a coated substrate; and c) removing solvent from said coated substrate.

20. The process of claim 18 wherein a zirconium material is blended with said electrochemically active cadmium material.

21. A process of claim 18 said zirconium material is zirconium oxide.

22. A process of claim 21 wherein said zirconium oxide bears a coating thereon of elemental silver.

23. A process of claim 18 wherein the polyamide resin is separately blended with the non-aqueous solvent prior to mixing with said electrochemically active cadmium material to form said paste.

24. A process of claim 18 wherein said paste is applied to the substrate through extrusion by passing the substrate through a coating die to which the paste is continuously supplied.

25. The process of claim 18 wherein nickel hydroxide is blended with the paste in an amount sufficient to serve as an anti-agglomerant.

26. A process of claim 18 wherein a microdenier fibrous material is blended into the paste in an amount sufficient to serve as an electrolyte wick in the finished electrode during use in a rechargeable alkaline cell.

27. A process of claim 18 wherein after said solvent removal step the paste coated substrate is sized by passing it through a calender.

28. A cadmium electrode produced in accordance with the process of claim 18.

29. A rechargeable alkaline cell comprising the cadmium electrode of claim 1.

30. A rechargeable alkaline cell comprising the cadmium electrode of claim 9.

31. A cadmium electrode for use in a rechargeable cell employing an alkaline electrolyte, comprising:
  a) an electrically conductive substrate supporting an electrochemically active material;
  b) an interconnecting polymeric network linked to the substrate and serving as a binder, said polymeric network formed of polyamide having a ratio of oxygen to carbon of from about 0.05 to about 0.09 and a ratio of nitrogen to carbon of from about 0.04 to about 0.08; and
  c) a mixture of particulate electrochemically active cadmium material and finely divided metallic silver coated on a nonelectrochemically active carrier, retained in and dispersed through said network.

32. A cadmium electrode for use in a rechargeable cell employing an alkaline electrolyte, comprising:
  a) an electrically conductive substrate supporting an electrochemically active material;
  b) an interconnecting polymeric network linked to the substrate and serving as a binder; and
  c) a mixture of particulate electrochemically active cadmium material and finely divided metallic silver coated on a non-electrochemically active carrier, retained in and dispersed through said network, and wherein the carrier is zirconium oxide and the binder is in the form of a microporous interconnecting polymeric network.

33. A cadmium electrode for use in a rechargeable cell employing an alkaline electrolyte, comprising:
  an electrically conductive substrate supporting an electrochemically active cadmium material;
  polyamide formed form a fatty acid dimer-based polyamide resin dispersed within the electrochemically active material which serves as an anti-agglomerant retarding cadmium agglomeration during use of the electrode;
  said fatty acid dimer including an aliphatic or cycloaliphatic dibasic acid containing from about 18 to 52 carbon atoms; and
  a mixture of particulate electrochemically active cadmium material co-dispersed with said polyamide and in electrical contact with the substrate during charge and discharge of the electrode.

34. A cadmium electrode for use in a rechargeable cell employing an alkaline electrolyte, comprising:
  an electrically conductive substrate supporting an electrochemically active cadmium material;
  polyamide, having the combination of hydrophilic and hydrophobic groupings and having a ratio of oxygen to carbon of from about 0.05 to about 0.09 and a ratio of nitrogen to carbon of from about 0.04 to about 0.08, dispersed within the electrochemically active material, the polyamide serving as an anti-agglomerant retarding cadmium agglomeration during the use of the electrode; and
  a mixture of particulate electrochemically active cadmium material co-dispersed with said polyamide and attached to said substrate.

35. The cadmium electrode of claim 34 wherein the electrochemically active cadmium material comprises cadmium oxide, and in admixture therewith nickel hydroxide in an amount to further retard cadmium agglomeration (and capacity fade).

36. The cadmium electrode of claim 34 wherein the polyamide anti-agglomerant is present as an interconnecting network in an amount from about 0.05 to about 3 percent by weight of the electrode (excluding the substrate).

37. The cadmium electrode of claim 34 wherein the polyamide is formed from a fatty acid dimer-based polyamide resin.

38. A process for producing a cadmium electrode for a rechargeable cell comprising the steps of:
  a) applying a mixture including an electrochemically active cadmium material to a conductive substrate to form a prefabricated electrode having a porous structure;
  b) forming a solution of polyamide in a solvent, the polyamide having the combination of hydrophilic and hydrophobic groupings, a ratio of oxygen to carbon of from about 0.05 to about 0.09, a ratio of nitrogen to carbon of from about 0.04 to about 0.08, and being of a type such that during cycling of the rechargeable cell agglomeration of the cadmium material is retarded;
  c) applying such polyamide solution to the prefabricated electrode so that the polyamide solution penetrates into and wets at least a portion of such porous structure; and
  d) removing solvent.

39. A process for producing a cadmium electrode for a rechargeable cell comprising the steps of:
  a) applying a mixture including an electrochemically active cadmium material to a conductive substrate to form a prefabricated electrode having a porous structure, and wherein the pre-fabricated electrode employs a binder formed from water dispersed polytetrafluoroethylene;
  b) forming a solution of polyamide in a solvent, the polyamide having a ratio of oxygen to carbon of from about 0.05 to about 0.09 and a ratio of nitrogen to carbon of from about 0.04 to about 0.08, and the polyamide being of a type such that during cycling of the rechargeable cell agglomeration of the cadmium material is retarded;
  c) applying such polyamide solution to the prefabricated electrode so that the polyamide solution penetrates into and wets at least a portion of such porous structure; and
  d) removing solvent.

40. The process of claim 39 wherein the polyamide is formed from a fatty acid dimer-based polyamide resin and the polyamide solution is applied by dipping the pre-fabricated electrode into the solution.

41. The process of claim 38 wherein the pre-fabricated electrode is a sintered electrode employing a porous sintered conductive material the pores of which contain the active cadmium material.

42. The process of claim 38 wherein the solvent is nonaqueous and of hydrocarbon base.

43. A cadmium electrode for use in a rechargeable cell employing an alkaline electrolyte, comprising:
  an electrically conductive substrate supporting an electrochemically active cadmium material;
  polyamide resin having the combination of hydrophilic and hydrophobic groupings and having a ratio of oxygen to carbon of from about 0.05 to about 0.09 and a ratio of nitrogen to carbon of from about 0.04 to about 0.08, soluble in a hydrogen bonding solvent, dispersed within the electrochemically active material, the polyamide serving as an anti-agglomerant retarding cadmium agglomeration during use of the electrode; and a mixture of particulate electrochemically active cadmium material co-dispersed with said polyamide and attached to said substrate.

44. The cadmium electrode of claim 43 wherein the polyamide resin is soluble in an aliphatic alcohol.

45. The cadmium electrode of claim 43 wherein the polyamide resin is alcohol soluble.

* * * * *

UNITED STATES PATENT AND TRADEMARK OFFICE
CERTIFICATE OF CORRECTION

PATENT NO.    : 5,064,735
DATED         : Nov. 12, 1991
INVENTOR(S)   : Guy G. Rampel; Vincent J. Puglisi It is certified that error appears in the above-identified patent and that said Letters Patent is hereby corrected as shown below:

Title Page:    [54]: delete "CADIUM" and substitute therefor "CADMIUM".

Column 1, first word: delete "CADIUM" and substitute therefor "CADMIUM".

Column 16, Claim 2, line 54: after "capacity" insert --fade--.

Column 18, Claim 15, line 4: after "wherein the" insert --zirconium--.

Signed and Sealed this

Ninth Day of March, 1993

*Attest:*

STEPHEN G. KUNIN

*Attesting Officer*        *Acting Commissioner of Patents and Trademarks*